United States Patent
Bricko

(10) Patent No.: US 6,485,036 B1
(45) Date of Patent: Nov. 26, 2002

(54) SULKY FOR OUTDOOR POWER EQUIPMENT UNIT

(75) Inventor: Thomas K. Bricko, Lakeville, MN (US)

(73) Assignee: The Toro Company, Minneapolis, MN (US)

( * ) Notice: Subject to any disclaimer, the term of this patent is extended or adjusted under 35 U.S.C. 154(b) by 0 days.

(21) Appl. No.: 09/861,997

(22) Filed: May 18, 2001

(51) Int. Cl.$^7$ .......................... B62D 63/00; B62C 1/00; A01B 59/00; A01D 34/64
(52) U.S. Cl. ........................ 280/32.7; 280/63; 172/677; 56/15.9
(58) Field of Search ................. 280/32.7, 86, 86.1, 280/43, 43.11, 43.13, 63; 172/677, 679, 680, 683; 56/DIG. 14, 15.9, 15.6, 16.2, 14.7, 14.9; 180/12

(56) References Cited

U.S. PATENT DOCUMENTS

| | | | |
|---|---|---|---|
| 1,582,947 A | * 5/1926 | Wagner et al. | 280/412 |
| 2,955,835 A | * 10/1960 | Chouinard | 280/43 |
| 3,485,314 A | 12/1969 | Herr | |
| 4,165,093 A | * 8/1979 | Biskup | 280/220 |
| 4,828,282 A | * 5/1989 | Pinto | 280/32.7 |
| 5,004,251 A | * 4/1991 | Velke et al. | 280/32.7 |
| 5,388,850 A | 2/1995 | Simone | |
| 5,413,364 A | 5/1995 | Hafendorfer | |
| 5,809,756 A | * 9/1998 | Scag et al. | 56/10.8 |
| 5,842,707 A | * 12/1998 | Smith | 280/32.7 |
| 5,882,020 A | 3/1999 | Velke | |
| 5,909,887 A | * 6/1999 | Hobrath | 280/32.7 |
| 5,947,505 A | * 9/1999 | Martin | 280/493 |
| D417,676 S | 12/1999 | Havener | |
| 6,062,582 A | 5/2000 | Martin | |
| 6,220,612 B1 | * 4/2001 | Baleski, Jr. | 280/87.041 |

FOREIGN PATENT DOCUMENTS

FR  2760713  * 9/1998  ................. 280/63

* cited by examiner

Primary Examiner—Brian L. Johnson
Assistant Examiner—G B Klebe
(74) Attorney, Agent, or Firm—James W. Miller

(57) ABSTRACT

A sulky for a self propelled, outdoor power equipment unit, such as a wide area mower or WAM, comprises independent left and right foot platforms to support a standing operator. A ground engaging caster wheel is carried on each foot platform to allow the foot platforms to roll over the ground during operation of the mower. The foot platforms are mounted to the mower by an axle with each foot platform being pivotally carried on the axle using a separate pivot hub. Thus, the foot platforms can pitch up and down separately from one another during operation of the mower over uneven terrain. Latches are provided for selectively holding the foot platforms in raised transport positions.

18 Claims, 5 Drawing Sheets

SULKY FOR OUTDOOR POWER EQUIPMENT UNIT

TECHNICAL FIELD

This invention relates to a sulky for a self propelled, outdoor power equipment unit, such as a walk behind lawn mower, to allow the operator to ride behind the unit rather than having to walk behind the unit. More particularly, this invention relates to a sulky that supports the operator in a standing position behind the outdoor power equipment unit.

BACKGROUND OF THE INVENTION

In the turf care industry, relatively large lawn mowers are known for mowing a wide swath of grass. A mower of this type is often referred to as a Wide Area Mower or by the corresponding acronym WAM. The mower comprises a self propelled traction frame supported for movement over the ground by a pair of rear drive wheels and a pair of front support wheels. A cutting deck housing a plurality of rotary cutting blades is suspended from the traction frame.

This mower also includes a handle assembly that extends upwardly and rearwardly from the traction frame. The handle assembly includes various operational controls that permit an operator to steer the traction frame and control the cutting blades housed on the cutting deck. The operator typically walks behind the mower during the cutting operation while holding the handle assembly to thereby guide and operate the mower. U.S. Pat. No. 4,558,558 shows a WAM of this general type.

Mowers of this type are often used by commercial cutters or by individual owners who cut relatively large tracts of grass. Even though the cutting swath is relatively wide, it still can take considerable time to cut a particular tract of grass. Walking behind the mower can become tiring. Thus, a need was recognized in the art to permit the operator to operate this type of mower without having to walk behind the unit.

To meet this need, various sulkies have been developed and sold for attachment to WAM's and similar implements. When such sulkies are so attached, they permit the operator to ride behind the mower, either in a sitting or standing position, but most typically in a standing position. Such sulkies are not themselves powered, but utilize the self propelling action of the mower to pull the sulky. As a result, the operator no longer must walk behind the mower, but, in effect, is towed by the mower as the mower propels itself over the tract of grass being cut.

Known prior art sulkies for standing operators typically comprise a wheeled platform on which the operator stands with the platform being hitched or coupled to the WAM. However, the ground being traversed by the mower is often uneven so that one side of the mower and the trailing sulky will rise or fall relative to the other side of the mower and the sulky. For example, one side of the mower and sulky might pass over a bump in the ground while the other side of the mower and sulky remains on level ground. Or, an operator might drive the mower at an angle up over a curb such that the wheels on one side of the mower and sulky rise up over the curb before the corresponding wheels on the other side of the mower and sulky rise up over the curb. Consequently, the mower and sulky will often roll about a longitudinal axis as the mower moves forwardly.

The side-to-side tilting of the sulky platform is something that tends to throw or rock the operator from side-to-side during the operation of the mower. The operator must anticipate the motion of the sulky platform and maintain his or her balance on the sulky platform. This requires some attention physical effort on the part of the operator. Thus, while conventional sulkies are effective in relieving the need for the operator to walk behind the mower, many operators find it very tiring to use sulkies having a sulky platform on which the operator stands.

SUMMARY OF THE INVENTION

One aspect of this invention relates to a sulky for a self propelled, outdoor power equipment unit to allow a standing operator to ride behind the outdoor power equipment unit as the outdoor power equipment unit is driven over the ground. The sulky comprises a pair of foot platforms with each foot platform being sized to receive one foot of the operator thereon such that the operator is supported in a standing position with one foot on one foot platform and the other foot on the other foot platform. At least one ground engaging wheel or roller is carried on each foot platform to allow the foot platforms to roll over the ground. A substantially horizontal pivot is provided on each foot platform to pivotally connect the foot platform to the outdoor power equipment unit such that each foot platform is able to pitch up and down relative to the outdoor power equipment unit as the outdoor power equipment unit traverses uneven terrain. The foot platform pivots are independent of one another to permit the foot platforms to pitch up and down independently of one another.

Another aspect of this invention relates to a sulky for a self propelled, outdoor power equipment unit. The sulky comprises independent left and right foot platforms which support a standing operator. At least one ground engaging wheel or roller is provided on each foot platform to allow the foot platforms to roll over the ground. A means is provided for pivotally connecting the foot platforms to the outdoor power equipment unit to provide independent pivoting motion of the foot platforms relative to one another.

BRIEF DESCRIPTION OF THE DRAWINGS

This invention will be described hereafter in the Detailed Description, taken in conjunction with the following drawings, in which like reference numerals refer to like elements or parts throughout.

DETAILED DESCRIPTION

Figure 1:
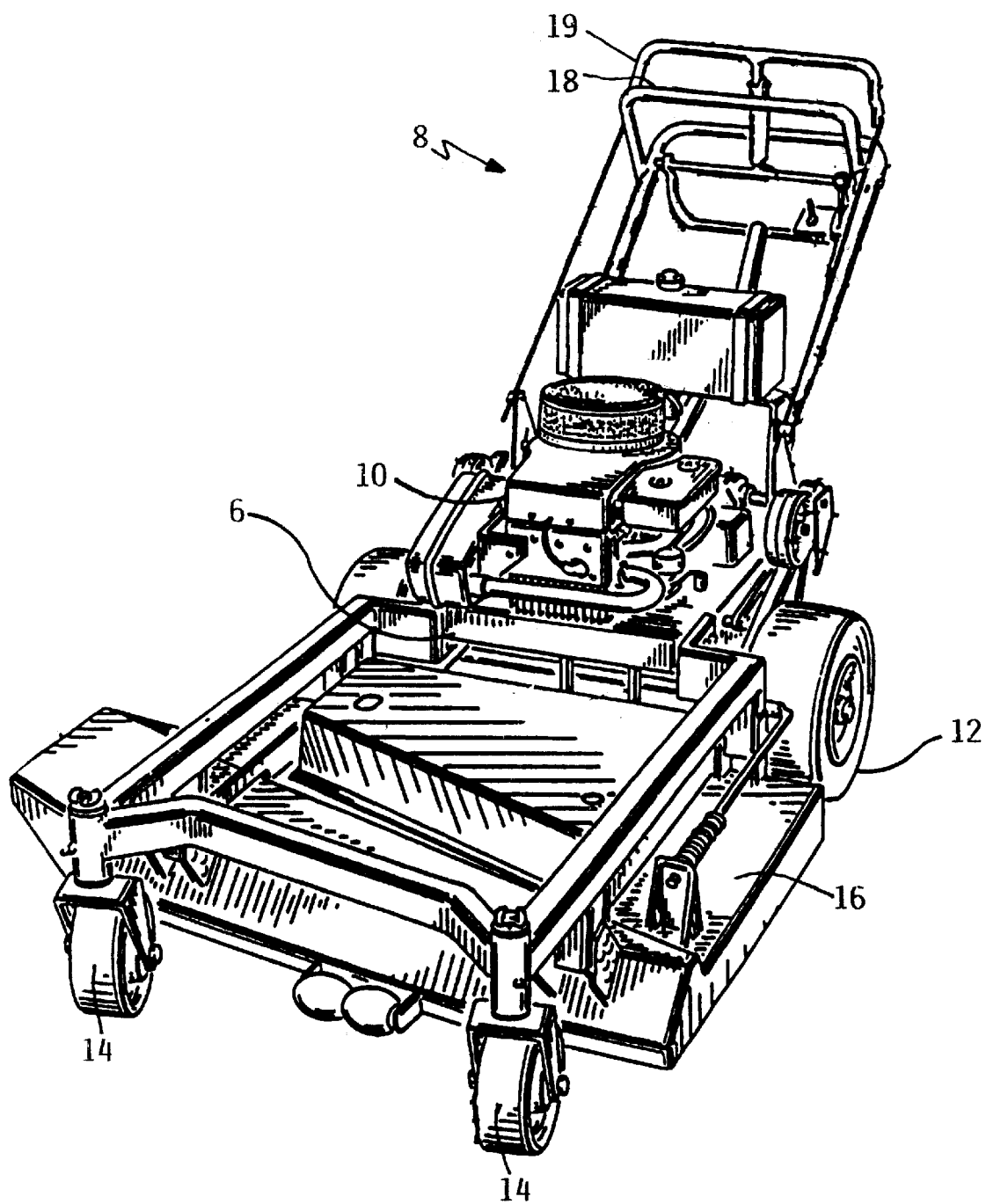
FIG. 1 is a perspective view of a self propelled, outdoor power equipment unit comprising a Wide Area Mower WAM.
Figure 2:
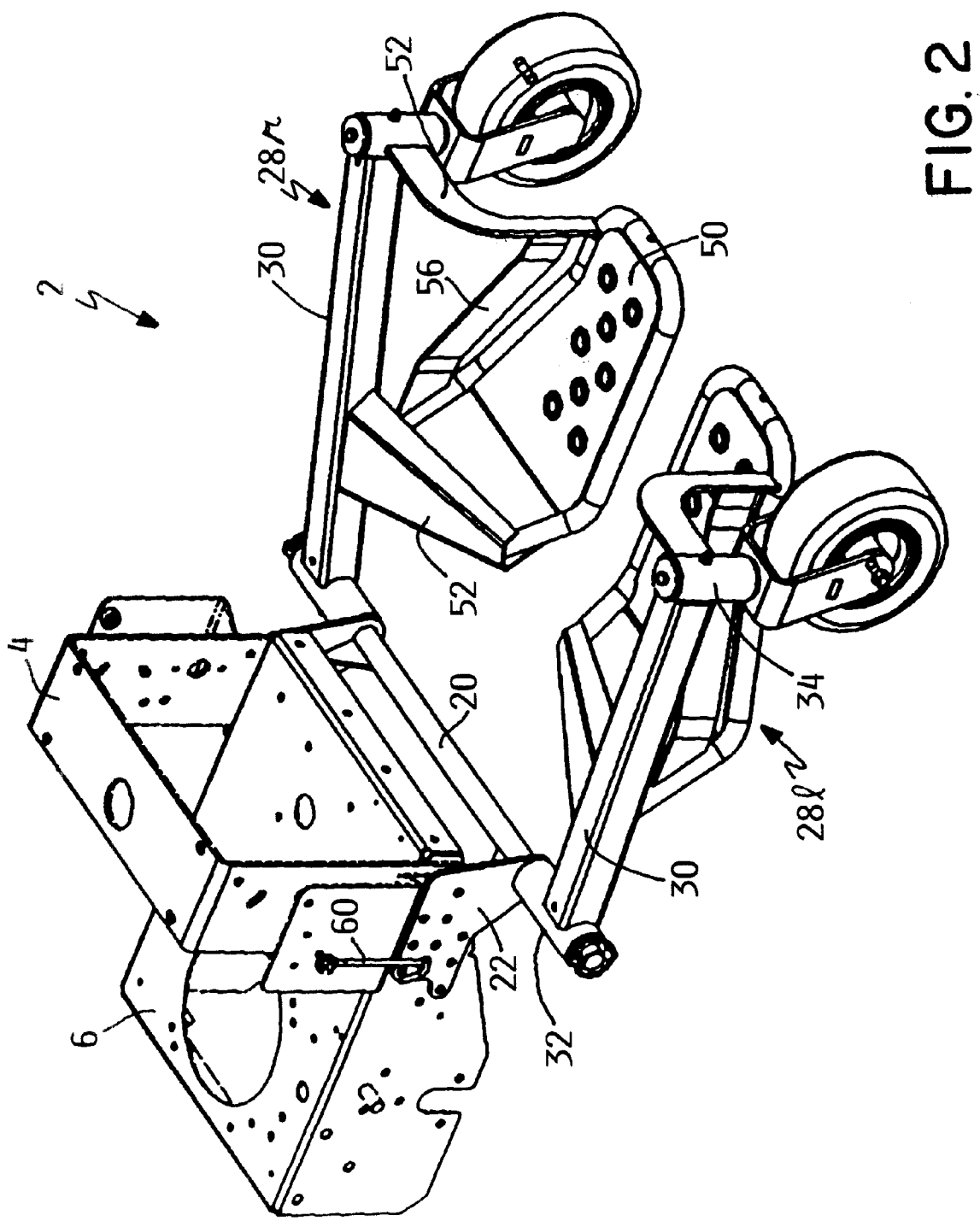
FIG. 2 is a perspective view of a sulky according to this invention, particularly showing the sulky attached to the rear of the traction frame of the self propelled, outdoor power equipment unit shown in FIG. 1.

FIG. 2 illustrates the sulky of this invention generally as 2. Sulky 2 is shown attached to a rear portion 4 of the traction frame 6 of a self propelled, outdoor power equipment unit 8. Only a small portion of traction frame 6 is shown with the rest of outdoor power equipment unit 8 simply not being shown in FIG. 1.

One type of outdoor power equipment unit 8 with which sulky 2 of this invention may be used is a Wide Area Mower or WAM, such as the Toro Proline Midsize Mower. The general details of such a mower are shown in U.S. Pat. No. 4,558,558, assigned to The Toro Company, the assignee of this invention, which patent is incorporated by reference. For background purposes, FIG. 1 depicts a typical WAM.

Referring now to FIG. 1, the WAM that is depicted comprises a traction frame 6 that carries an internal combustion engine 10 or other suitable power source. Traction frame 6 is supported for movement over the ground by a pair of rear drive wheels 12 and a pair of front support wheels 14. A cutting deck 16 houses a plurality of rotary cutting blades (not shown). Cutting deck 16 is suspended from traction frame 6.

The WAM also includes a handle assembly 18 that extends upwardly and rearwardly from traction frame 6. Handle assembly 18 includes various operational controls 19 that permit an operator to steer traction frame 6 and control the cutting blades housed within cutting deck 16. Typically, an operator walks behind the WAM and holds handles assembly 18 to steer and guide the WAM. Sulky 2 of this invention attaches to the WAM to allow an operator to ride behind the WAM as the WAM propels itself over the ground.

While a WAM comprises one type of outdoor power equipment unit 8 with which sulky 2 of this invention may be used, sulky 2 is not limited for use with a WAM. Sulky 2 may be used on other outdoor power equipment units that are self-propelled and which have handle assemblies that are normally gripped by an operator who stands on the ground and walks behind outdoor power equipment unit 8. Thus, sulky 2 may be used with walk behind, compact utility loaders, tillers, or other walk behind units carrying a turf grooming or ground working tool or implement.

Figure 3:
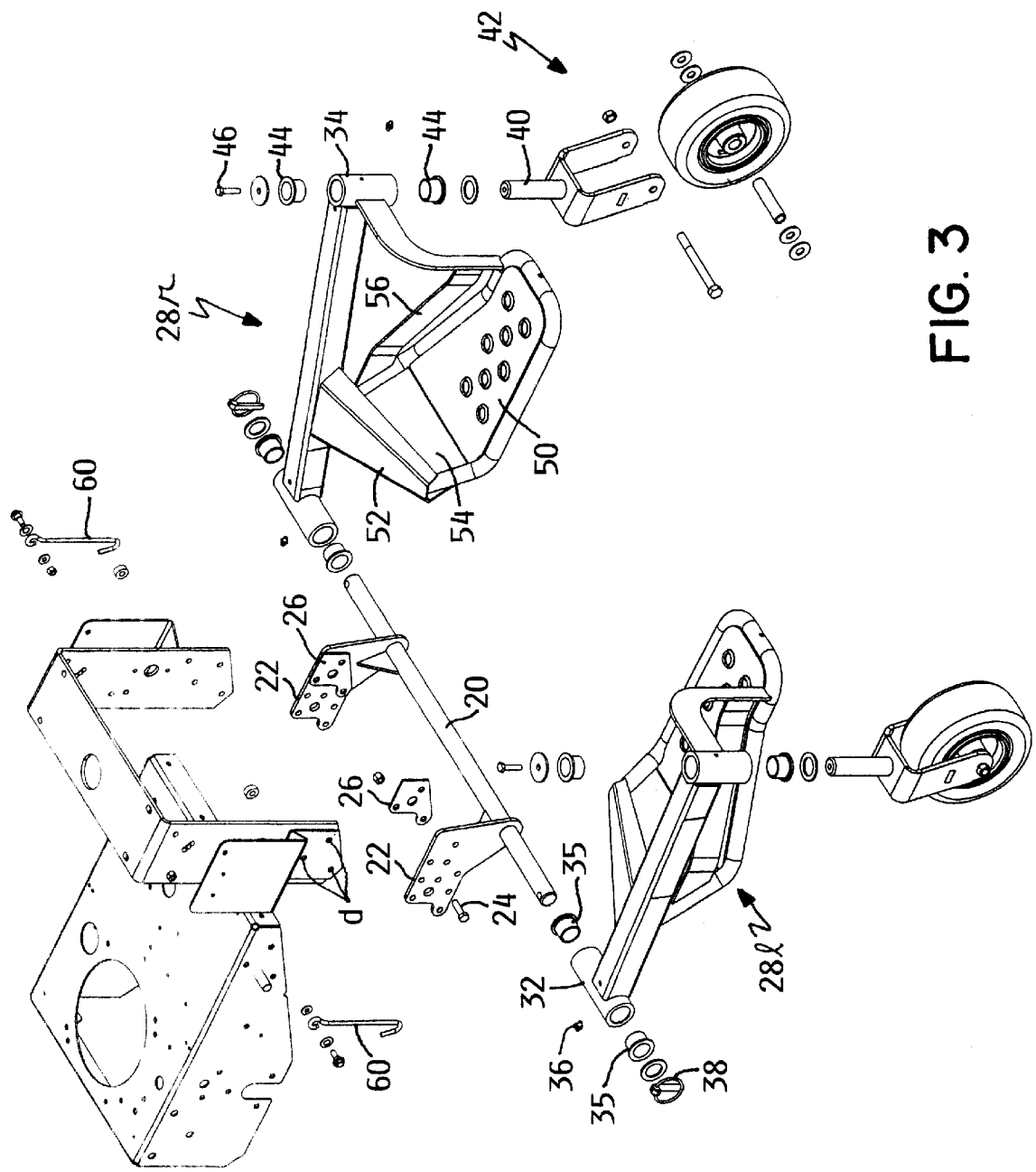
FIG. 3 is an exploded perspective view of the sulky shown in FIG. 2.
Figure 4:
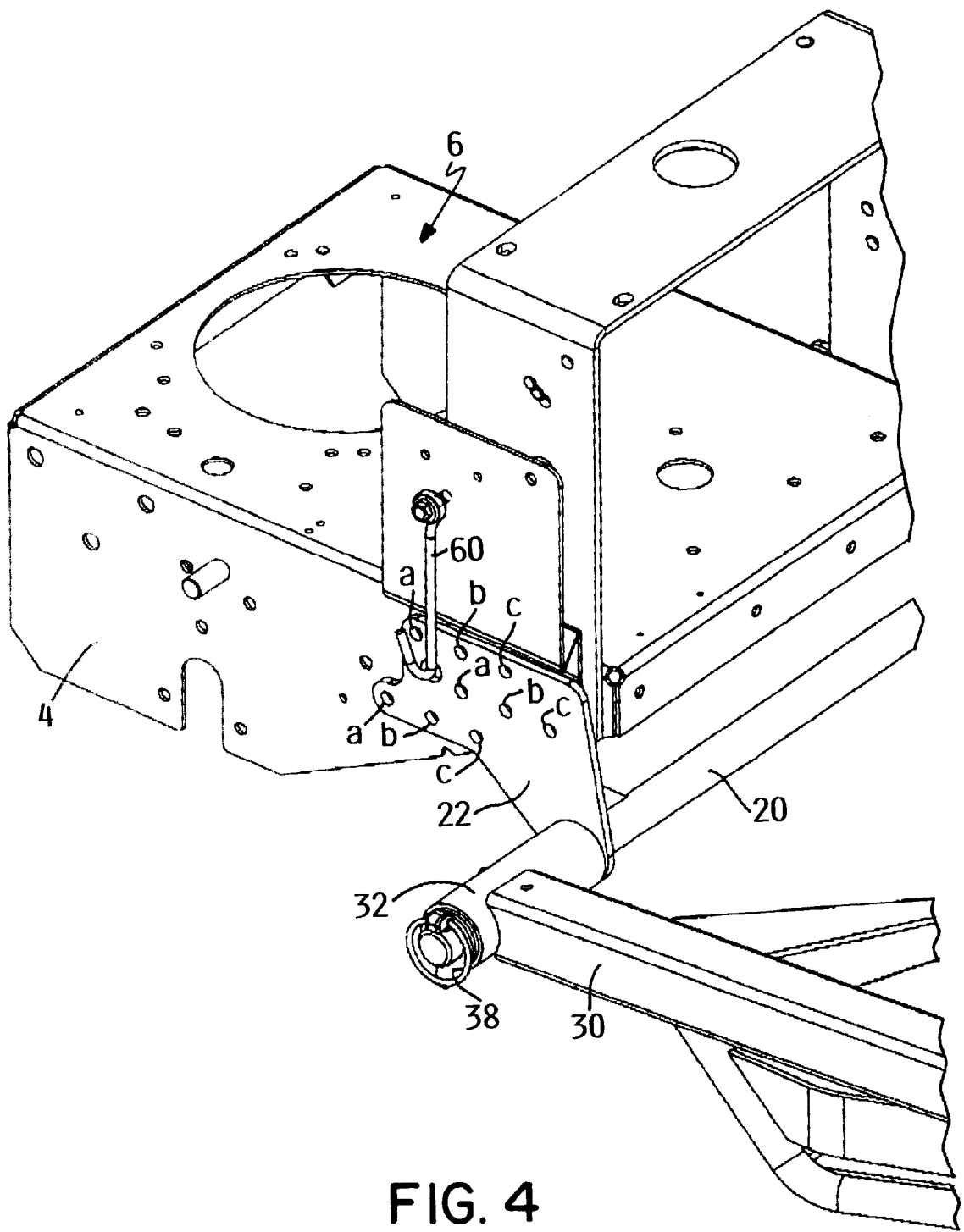
FIG. 4 is an enlarged perspective view of a portion of the sulky shown in FIG. 2, particularly illustrating the attachment of the sulky to the traction frame of the self propelled, outdoor power equipment unit shown in FIG. 1.
Figure 5:
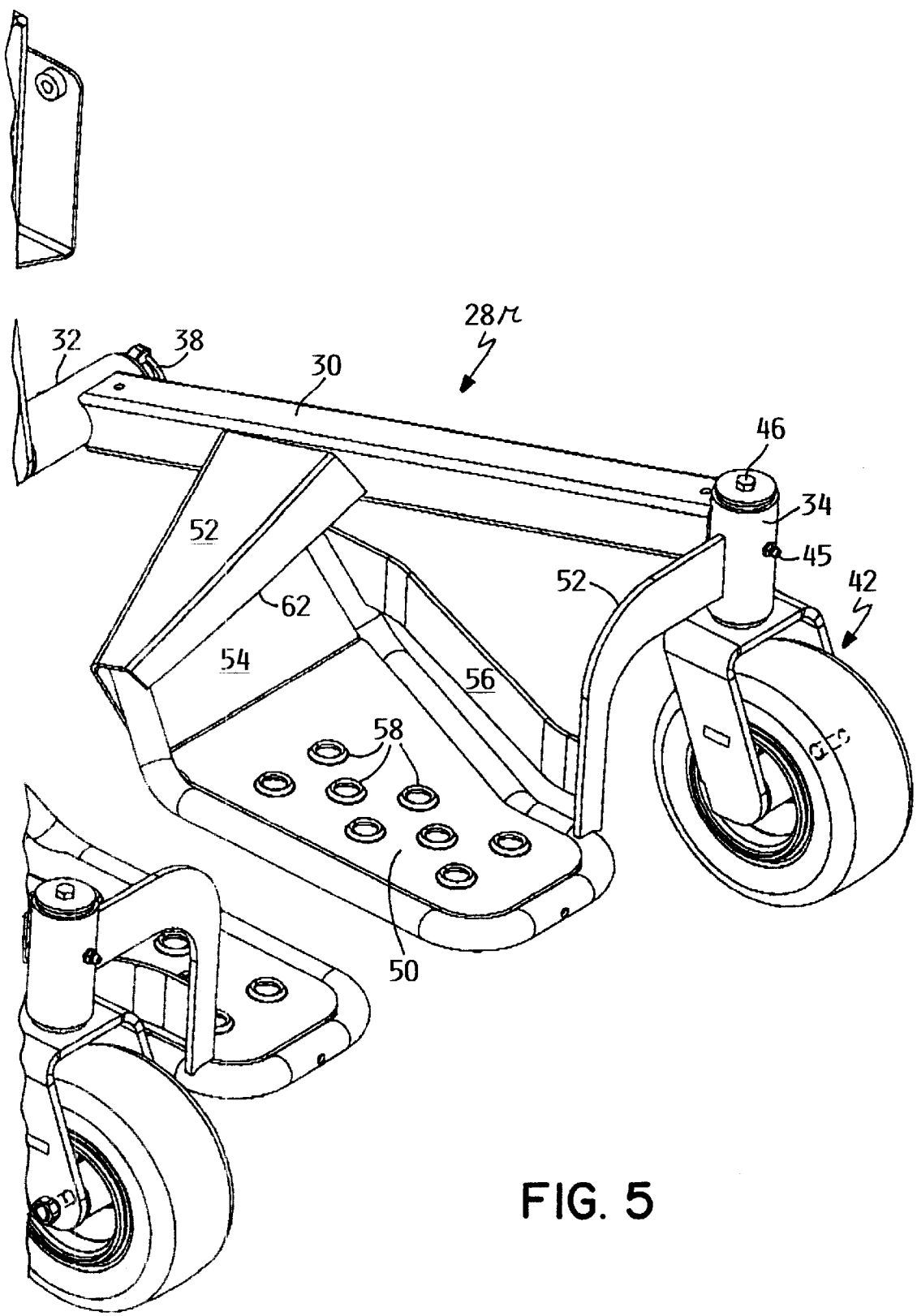
FIG. 5 is an enlarged perspective view of a portion of the sulky shown in FIG. 2, particularly illustrating one of the foot platforms thereof.

Sulky 2 of this invention is mounted to the rear portion 4 of traction frame 6 of outdoor power equipment unit 8 by a fixed axle 20 that is rigidly attached to traction frame 6. A pair of mounting brackets 22 are welded or otherwise fixed to axle 20. Each mounting bracket 22 has three sets of attachment holes a, b or c in an identical triangular hole pattern. See FIG. 4. Any one set of attachment holes a, b or C in one bracket 22 can be aligned with a triangular set of mounting holes d provided on traction frame 6. See FIG. 3. Three mounting bolts 24, only one of which is shown in FIG. 2, pass through the aligned sets of attachment and mounting holes, i.e. through the set of holes d and one set of the holes a, b or c, to bolt mounting brackets 22 to traction frame 6. If required, spacer plates 26 can be used between mounting brackets 22 and traction frame 6.

The use of three sets of attachment holes a, b and c on mounting brackets 22 provides some fore and aft adjustability for sulky 2 relative to outdoor power equipment unit 8. If the forwardmost set of holes a is used, then sulky 2 will be positioned further rearwardly than if the middle or reardwardmost set of holes b or C is used. This fore and aft adjustability is preferred to accommodate operator preference in how close sulky 2 follows outdoor power equipment unit 8 and to mount sulky 2 to different outdoor power equipment units 8 in which handle assemblies 18 might be slightly differently configured. However, if desired, this fore and aft adjustability could be dispensed with and mounting brackets 22 could be provided with only a single set of attachment holes for bolting axle 20 to traction frame 6 in only one position.

In any event, when mounting brackets 22 are bolted to traction frame 6, axle 20 is rigid and non-rotatable. Axle 20 forms a horizontal pivot axis for various movable portions of sulky 2.

Sulky 2 also includes dual, independent, left and right foot platforms 28l and 28r. Foot platforms 28 are identical to one another, except that the right foot platform 28r is a mirror image of the left foot platform 28l. Thus, a description of one foot platform 28 will serve to describe the other foot platform 28.

Referring now to either foot platform 28, foot platform 28 comprises an elongated structural beam 30 having a horizontal pivot hub 32 at the forward end and a vertical pivot hub 34 at the rearward end. Horizontal pivot hub 32 is received on one end of fixed axle 20. Various bushings 34 may be used between axle 20 and horizontal pivot hub 32 to facilitate rotation of pivot hub 32 about the pivot axis formed by axle 20. Pivot hub 32 may include a grease fitting 36 to allow lubrication of the interior of pivot hub 32. Pivot hub 32 is retained on the end of axle 20 by a generally conventional lynch pin 38.

Vertical pivot hub 34 on the rear end of beam 30 pivotally journals the upright pivot shaft 40 of a caster wheel assembly 42. Again, bushings 44 may be used between pivot shaft 38 and vertical pivot hub 34 to facilitate rotation of caster wheel assembly 42 and vertical pivot hub 34 may have its own grease fitting 45. Caster wheel assembly 42 is retained in place within the vertical pivot hub 34 by a screw 46 that passes down into a threaded bore in the upright pivot shaft 40 of caster wheel assembly 42. Caster wheel assembly 42 supports the foot platform for rolling over the ground. As is conventional for caster wheel assemblies, caster wheel assembly 42 can pivot about a vertical pivot axis by having its pivot shaft 40 rotate within the vertical pivot hub 34 of foot platform 28.

Foot platform 28 further includes a substantially horizontal foot pad 50 which is wide enough to support one foot of the operator, i.e. foot pad 50 on the left foot platform 28l supporting the left foot of the operator and foot pad 50 on the right foot platform 28r supporting the right foot of the operator. Each foot pad 50 is secured to beam 30 by various cantilever mounting flanges 52. An upwardly and forwardly inclined front shield 54 is located at the front of foot pad 50 to shield the operator's foot as sulky 2 moves forwardly. A side rail 56 may be located on the outer side of foot pad 50 to help retain the operator's foot on foot pad 50. The inner and rear sides of foot pad 50 are open to allow the operator to easily place his foot onto foot pad 50. As shown in the drawings, foot pad 50 is located below beam 30 so as to keep the operator's feet close to ground level. Each foot pad 50 may have a plurality of knobs or protrusions 58 to provide a roughened surface that enhances footing.

As is apparent from the foregoing description and the drawings, sulky 2 of this invention provides a pair of independent foot platforms 28 each of which can pivot independently about a substantially horizontal pivot axis. In the case of the preferred embodiment shown in the drawings, this pivot axis is the axis formed by axle 20. The horizontal pivots carried on foot platforms 28 are those formed by the horizontal pivot hubs 32. The net effect of this is to let each foot platform pitch or pivot up and down separately and independently from the other during operation of sulky 2.

Thus, as outdoor power equipment unit 8 to which sulky 2 is attached is driven forwardly, there will come instances in which one foot platform 28 encounters a bump or rise while the other foot platform 28 does not. In the case of sulky 2 of this invention, whichever foot platform encounters the bump will rise up when this occurs, but the other foot platform will remain horizontal. Thus, the operator who is standing on sulky 2 simply feels one foot rise up while the other foot remains horizontal, but the operator is not thrown to one side or the other. This can be contrasted with prior art sulkies which have a single foot platform that tilts to one side or the other when this condition is encountered. In these prior art sulkies, the operator is being thrown to one side or the other as sulky 2 goes over uneven terrain.

Sulky 2 of this invention is more comfortable and less fatiguing to ride than prior art sulkies. This is believed to be due to the fact that the tilting of a single foot platform is avoided by the use of dual, independently pivotal foot platforms. The rise and fall of one of the operator's feet when a rise is encountered by one side of sulky 2 is simply a much different, and less fatiguing experience, that riding a tilting, unitary foot platform. Thus, sulky 2 of this invention has considerable advantages over those of the prior art.

In addition, sulky 2 of this invention is easier and safer to ride and operate when the mower is moving in reverse than many prior art sulkies. Many prior art sulkies are attached to the mower by a ball or vertical pivot joint. Thus, when the mower is backing up or moving in reverse, such sulkies act much like a trailer with the operator often finding it difficult to keep the sulkies straight while backing up, the sulkies tending to buckle to one side or the other about the ball or vertical pivot joint. Sulky 2 of this invention does not have this tendency to buckle. Thus, a mower equipped with sulky 2 of this invention is easier and safer to back up than mowers equipped with many of the prior art sulkies.

Foot platforms 28 of sulky 2 are normally in an operating position in which caster wheel assemblies 42 are in engagement with the ground and foot platforms 28 are free to pivot up and down independently about the substantially horizontal pivot axis formed by axle 20. However, in some cases, it might be desirable to latch or retain foot platforms 28 in a raised, transport position in which caster wheel assemblies 42 are up off the ground. In this raised transport position, foot platforms 28 are desirably vertically oriented with caster wheel assemblies 42 now being located above the ground and facing to the rear.

A pair of foot platform latches in the form of pivotal hooks 60 are provided on traction frame 6. When foot platforms 28 are raised into their transport positions, each hook 60 can be hooked on some portion of foot platform 28, such as the lip 62 formed on front mounting flange 52. When so hooked, foot platform 28 will be retained in its raised transport position.

Various modifications of this invention will be apparent to those skilled in the art. For example, while a single axle 20 has been shown as providing a pivot shaft for the horizontal pivot hubs 32 of foot platforms 28, two stub axles could be used in place of a single axle. In addition, the positions of pivot hubs 32 and axles or pivot shafts could be reversed if so desired. In other words, pivot hubs 32 could be fixedly carried on traction frame 6 while foot platforms 28 could each carry a stub shaft that would be pivotally received in pivot hubs 32. Thus, the exact nature of the horizontal pivot between foot platforms 28 and traction frame 6 of outdoor power equipment unit 8 could obviously be varied.

The use of hooks 60 is preferred so as to be able to latch foot platforms 28 in a raised transport position. However, the nature of the latches could vary from hooks and the latches could be deleted if so desired.

While a caster wheel assembly 42 is preferred for allowing foot platforms 28 to roll over the ground, other wheels or rollers could be used in place of a caster wheel assembly.

Accordingly, the invention is to be limited only the by the appended claims.

I claim:

1. A sulky for a self propelled, outdoor power equipment unit to allow a standing operator to ride behind the outdoor power equipment unit as the outdoor power equipment unit is driven over the ground, which comprises:
    (a) a pair of foot platforms with each foot platform being sized to receive one foot of the operator thereon such that the operator is supported in a standing position with one foot on one foot platform and the other foot on the other foot platform;
    (b) at least one ground engaging wheel or roller carried on each foot platform to allow the foot platforms to roll over the ground; and
    (c) a substantially horizontal pivot on each foot platform to pivotally connect the foot platform to the outdoor power equipment unit such that each foot platform is able to pitch up and down relative to the outdoor power equipment unit as the outdoor power equipment unit traverses uneven terrain, wherein the foot platform pivots are independent of one another to permit the foot platforms to pitch up and down independently of one another.

2. The sulky of claim 1, wherein the foot platform pivots are aligned with one another when the foot platforms are connected to the outdoor power equipment unit such that the foot platforms pivot about a common pivot axis.

3. The sulky of claim 2, further including a substantially horizontal axle that is attached to a rear portion of the outdoor power equipment unit such that the axle forms the common pivot axis for the foot platforms, and wherein the foot platform pivots comprise hubs that are received on opposite ends of the substantially horizontal axle.

4. The sulky of claim 1, wherein a single ground engaging wheel or roller is provided on each foot platform.

5. The sulky of claim 4, wherein the single ground engaging wheel or roller comprises a caster wheel.

6. The sulky of claim 1, wherein each foot platform includes an elongated beam having the pivot at one end thereof and the at least one ground engaging wheel or roller at the other end thereof.

7. The sulky of claim 6, wherein each foot platform includes a substantially horizontal foot pad carried by the elongated beam.

8. The sulky of claim 7, wherein the foot pad is recessed below the level of the beam.

9. The sulky of claim 1, further including a pair of foot platform latches that may be selectively engaged with the foot platforms to selectively hold each foot platform in a raised transport position in which the foot platform is out of contact with the ground.

10. The sulky of claim 9, wherein the latches are carried on the outdoor power equipment unit.

11. The sulky of claim 9, wherein the pair of latches comprises a pair of hooks carried on the outdoor power equipment unit.

12. A sulky for a self propelled, outdoor power equipment unit, which comprises:
    (a) independent left and right foot platforms which support a standing operator;
    (b) a ground engaging caster wheel carried on each foot platform to allow the foot platforms to roll over the ground;
    (c) a separate pivot between each foot platform and the outdoor power equipment unit to permit the foot platforms to pivot separately from one another during operation of the outdoor power equipment unit.

13. The sulky of claim 12, wherein the separate foot platform pivots are arranged on a substantially horizontal, common pivot axis.

14. The sulky of claim 13, wherein at least one substantially horizontal axle is mounted to the outdoor power equipment unit with the at least one axle forming the common pivot axis, and wherein each foot platform is pivotally carried on the at least one axle using a separate pivot hub.

15. The sulky of claim 14, wherein a single substantially horizontal axle is mounted to the outdoor power equipment unit with the single axle forming the common pivot axis.

16. The sulky of claim 15, wherein the single axle is mounted to the outdoor power equipment unit by mounting brackets whose fore and aft position on the outdoor power equipment unit can be adjusted.

17. The sulky of claim 12, further including latches for selectively latching the foot platforms in raised transport positions.

18. A sulky for a self propelled, outdoor power equipment unit, which comprises:

(a) independent left and right foot platforms which support a standing operator;

(b) at least one ground engaging wheel or roller on each foot platform to allow the foot platforms to roll over the ground; and (c) means for pivotally connecting the foot platforms to the outdoor power equipment unit to provide independent pivoting motion of the foot platforms relative to one another.

* * * * *